April 7, 1942.    A. RÁKOS    2,278,487
ELECTRICAL WELDING
Filed April 17, 1937    2 Sheets-Sheet 1
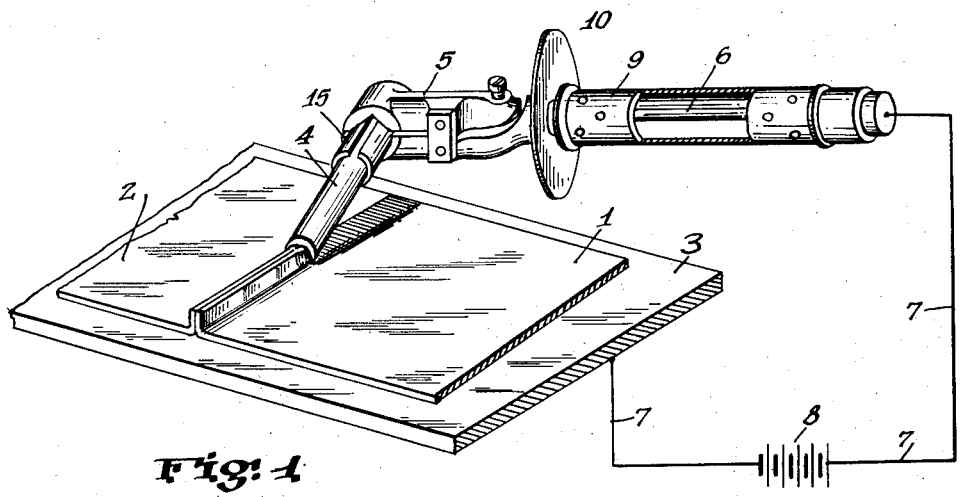
Fig. 1
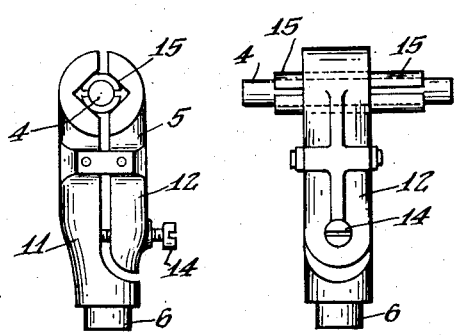
Fig. 2    Fig. 3
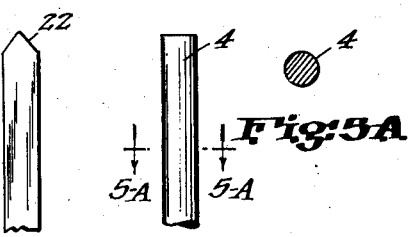
Fig. 4    Fig. 5
 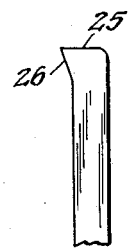  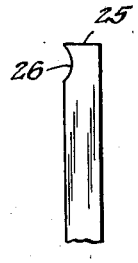  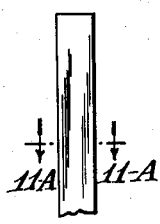
Fig. 6    Fig. 7    Fig. 8    Fig. 9    Fig. 10    Fig. 11
Fig. 11-A
INVENTOR.
Alexander Rakos
BY
ATTORNEY.

Patented Apr. 7, 1942

2,278,487

UNITED STATES PATENT OFFICE 2,278,487

ELECTRICAL WELDING

Alexander Rákos, Vienna, Austria

Application April 17, 1937, Serial No. 137,392
In Austria July 13, 1936

3 Claims. (Cl. 219—10)

This invention relates to a method of electrical welding bodies of metal or alloy along a desired seam. In particular the invention relates to electrical welding of thin bodies such as plates or sheets of metal or alloy which may have a thickness of less than about ⅛", down to a few hundredths of 1" and even to a few mills of 1".

It is an object of the invention to effect electrical welding of such bodies in an efficient way yielding a strong seam.

It is still another object of the invention to influence the chemical nature of the bodies to be welded in the seam during welding.

It is a further object of the invention to weld thin bodies of metal or alloy without substantially impairing their mechanical or chemical properties close to the seam.

In particular, it is an object of the invention to efficiently weld very thin bodies of metal or alloy, liable to quick oxidation when heated to welding temperatures, such as aluminum.

It is another object of the invention to efficiently weld thin plates or sheets of metal or alloy comprising superficial layers formed by their oxides, such as aluminum covered by aluminum oxide, or hydroxides.

These and other objects of the invention will be realized more clearly when this description proceeds with reference to the drawings.

In the drawings.

Fig. 1 shows more schematically and in perspective an arrangement permitting the performance of the method according to the invention.

Figs. 2, 3 show a support for a heater body used for the purposes of the invention in front and side elevation, respectively;

Figs. 4, 5, 6, 7, 8, 9, 10 and 11 show different types of such heater bodies by way of example (Fig. 5A shows a cross-section through the heater body shown in Fig. 5 along the line 5A—5A; Fig. 11A shows a cross-section through the heater body shown in Fig. 11 along the lines 11A—11A);

Figure 12:
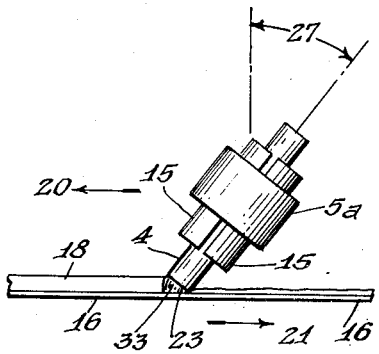
Figs. 12, 13, 14 show another performance of the invention in side elevation and viewed from the rear and from above respectively, and Fig. 15 a modification of the latter.

It is known to weld electrically more or less thin bodies of metal or alloy by including the bodies to be welded and an electrode into a low voltage circuit. The bodies to be welded contact each other along the seam to be formed, and additional material preventing oxidation or causing desoxidation of oxide if formed on the seam may be present.

The point of the electrode contacts the bodies to be welded and is submerged in material preventing oxidation or causing desoxidation of oxide, if present.

It is intended thereby to form the seam by melting the material of the bodies to be connected and causing the melt to coalesce, whereas the electrode material does not participate in the formation of the seam. Nevertheless, the electrode is used up during operation by oxidation and other undesired corrosion, and has to be replaced. The corrosion products, if incorporated in the melt formed in the seam to be welded, are undesired additions thereto.

With these known methods the electrode contacting the bodies on the places to be welded is provided with a point or edge contacting the bodies in the smallest possible area. The current flowing through the circuit being concentrated at such a point or edge heats it up to a degree sufficient for melting the material at the contacted places of the seam. Furthermore, the natural contact resistance between the point and the contacted bodies aids in this heating procedure.

The heat thus conveyed to the contacted places was relatively small and could be used only for welding small spots on very thin bodies but did not suffice to weld thin bodies along the seam in a continuous process, advancing thereby the electrode along the seam in an efficient and economical way.

Referring to the drawings, in Fig. 1 thereof two bodies 1, 2 to be welded are fixed on a support 3. An electrode 4 is held in a support 5 and connected by a conducting rod 6 with a conductor 7 leading to a source of low voltage current 8 of any desired type. The battery shown is only an example of such a source, and it may be mentioned incidentally that the invention is neither limited to direct or alternating current application, nor to any voltage although a voltage is preferred which cannot cause arc formation. The rod 6 is covered by a handle 9 of insulating material. 10 forms a screen protecting the hand holding handle 9 from the heat developed by the heater body 4 if the support is held and moved by hand and not by mechanical means. Support 5 may consist of two parts 11, 12 between which the heater body 4 is clamped by means of a screw 14. 15 are conductive sleeves of copper interposed between the support and the heater body; the current is fed to the heater body of conductive material by the rod 6. The end of the heater body may be shaped as to be seen in Figs. 4 to 11.

Figure 13:
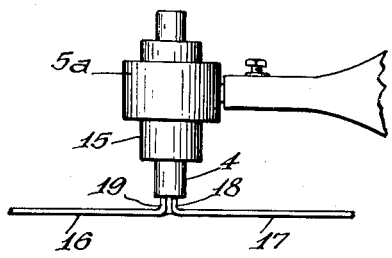
Figure 14:
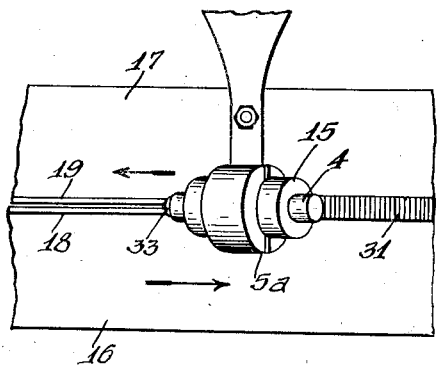

In Figs. 12, 13, 14 is shown an application of the invention for welding thin plates or sheets 16, 17, for instance of aluminum. The seam to be formed is prepared by crimping upward the edges 18, 19 of the sheets, and by contacting these edges by the heater body 4 held in support 5a. Obviously a heater body shaped according to Fig. 5 is chosen.

In performing the welding process, the upward bent edges 18, 19 are contacted by the flat surface of the heater body 4, whereby the electrical circuit is closed and current flows through the heater body, consisting of high melting point material not attached by the oxygen of the surrounding air at welding temperature of aluminum. Aluminum melting at about 660° C., the material of the heater body 4 is made for instance of tungsten or molybdenum which melts at 3260° C. and 2620° C., respectively, and which remains solid at operation temperatures.

The heater body is dimensioned so as to develop high temperature heat of about 2000° to 2500° C. which instantly melts portion 33 of the crimped edges 18, 19 ahead of the contacted place of the seam. This portion is in continuous contact with the heater body, is thereby overheated and conveys its surplus of heat to other portions further ahead of the heater body.

Now, the heater body is moved in the direction of arrow 20 relative to the seam, or the bodies 16, 17 are moved in the direction of arrow 21 relative to the heater body, if the latter is stationary. The speed of movement is adjusted so that the front face of the heater body remains in continuous contact with melted parts of the upward extending edges, until after the entire seam has been passed and its welding is completed. Thereby the melted and over-heated portion 33 which remains in continuous contact with the hot heater body and has the approximate size of a drop, quasi travels ahead of and with the heater body along the seam.

The high temperature heat developed by the heater body does not reach far. It reaches concentrated and effectively only body portions close to and in contact with it, such as of the upward bent edges. Consequently, that heat acts only locally while other portions of the bodies to be welded which are spaced from the place contacted by the heater body will not be affected. The high temperature heat evolving by convection and radiation from the heater body melts the metal or alloy of the bent edges a short distance ahead of the surfaces of the heater body, so that the front surface of the latter if moved with proper speed does not contact solid material of the edges, but either plastic or molten material, the latter just starting to flow down to fill the seam. Thereby the speed of welding can be increased and other advantages are obtained to be explained more in detail later on.

Contrary hereto, with known methods the points or edges of the electrodes originate heat only sufficient for melting away just contacted solid portions but do not overheat and thereby thermally affect the melt just formed.

The front surface of the heater body thus contacting metal just melted and previously contained in the upward bent edges 18, 19 covers this molten metal while it flows down to fill the gap of the seam, and protects it somewhat against the surrounding air. Since the metal is liable to oxidation, as aluminum is, by such covering of the melt its oxidation is materially prevented. Otherwise oxides formed by the hot aluminum melt on open air will due to their greater specific weight settle down to the bottom of the weld or evaporate.

In order to increase such protective action one may shape the ends of such heater body for instance in any of the ways shown in the exemplifications of Figs. 4 to 11. The heater bodies according to Figs. 4 to 7 are supposed to be of circular cross section as indicated in Fig. 5a, whereas those according to Figs. 8 to 11 are of square cross section as indicated in Fig. 11a.

A heater body according to Fig. 4 used according to my invention, touches the edges 18, 19 for instance with its front face 22 and its edge. The front face 22 is to be brought into the position of the front face 23 of the heater body 4 in Fig. 12. Fig. 5 shows the heater body as used in Fig. 12. The bent edges 18, 19 ought to lie within the cavity 24 of the heater body shown in Fig. 6 or 8, whereby the melt formed is covered very thoroughly. The heater body according to Figs. 7 and 9 may touch the bent edges with the face 25, the face 26 being shaped so as to lie as far as possible removed from the melted down material in order to permit its quick cooling. The heater body according to Fig. 10 is to be used similarly to the one of Fig. 4, the heater body according to Fig. 11 similarly to the one of Fig. 5.

Figure 15:
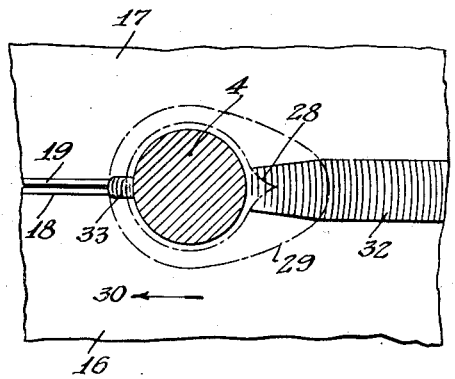

As shown in Fig. 12, the heater body is inclined at an angle 27 against the vertical direction. Taking a cylindrical heater body according to Fig. 5, the result would be that the heat evolving and radiating from the cylindrical surface of the heater body melts the edges ahead of it, and the melt has to pass under the horizontal lower front surface of the heater body whereby it is spread to the sides. Fig. 15 shows a view from above of a cylindrical heater body 4 arranged vertical to the bodies 16, 17. The area within the broken line 28 indicates by way of example the reach of the radiant high temperature heat from the body 4 within which freely standing thin aluminum bodies, as represented by the bent edges 18, 19 would instantly melt. The area within the broken line 29 shows the very narrow utmost limits as proven by experiments where increased temperature resulting from the heat conveyed from the body 4 can be noticed. Due to the fact that in the melt deposited on the seam latent heat is accumulated which dissipates when the melt solidifies, the areas 28, 29 extend further behind the body 4 than in front of it, if it is moved in the direction of arrow 30 relative to the stationary bodies 16, 17. 31, 32 show the deposited and solidified melt forming and covering the seam. It is obvious that by moving the body 4 in the direction of arrow 30 portions 33 of the bent edges 18, 19 arriving in the zone 29 are preheated and, arriving in the zone 28 are melted. Preheating can be done by applying other heating methods also.

It has been experienced that a perfect weld of aluminum sheets having a thickness of .01 to .005'' can be accomplished if the sheets are preheated for instance to a temperature between about 400° to 500° C.

According to my invention the high temperature heater body is in continuous contact with a melt just formed, thereby developing a relatively extended contact area. Thereby it becomes possible for substances carried by the heater body to react chemically or physically with the melt. Sometimes it is to be preferred that no such chemical and only a physical reaction, e. g., by overheating occurs, and for that purpose the material of the heater body has to be chosen so as to be incapable of chemically reacting with the melt at least to an undesired degree. In general, by using a heater body consisting of tungsten or tantalum, such reactions can be substantially prevented.

In some cases it may be desirable to incorporate into the melt certain substances or even to cause their chemical reaction with the oxides on the melt. Thus, if bodies covered by oxides are welded, the heater body may contain finely divided platinum or palladium in smallest amounts, and hydrogen containing gases may be led through channels of the heater body to the place of welding. Thereby at the high temperatures prevailing within the heater body and the place of welding, in the presence of finely divided platinum or palladium free hydrogen is formed in statu nascendi, i. e., in its unstable atomic state, which reacts instantly with the oxide contained in superficial layers of the bodies. The oxides are reduced thereby and vapor is formed which escapes.

Bodies consisting of or containing certain metals such as aluminum or tantalum are liable to oxidize in the air at room temperature, and to cover themselves with a generally desirable film consisting of oxides, or hydroxides, of aluminum or tantalum. It is undesirable, however, that such oxides or hydroxides be incorporated in the seam itself, because they weaken it. Furthermore, such oxides act to a certain degree like electrical insulators, and the electrical welding current to flow through the metal body can be considerably reduced or even interrupted by such oxide films on contacted places of the seam. Therefore, in starting the welding operation on such bodies covered by superficial layers of oxides, first the oxides are to be removed from the place of the seam where welding is started. This can be done by simply mechanically grinding off the oxides by means of the solid surface of the heater body. Thereby the circuit is closed for the current of the heater body, and the heat evolving from it must be of a temperature sufficiently high to melt the oxide film and the metal of the seam portions close to and just ahead of the heater body. The oxides thus melted are removed by either settling to the bottom of the weld or evaporation and the heater body advancing along the seam remains in contact with a metallic melt. The heater body heats the bodies to be welded only locally, and removes thereby the oxides locally also. By properly dimensioning the surface area of the heater body it can be made to cover the melt where its oxide coating has been melted away.

Similar conditions prevail if the thin bodies to be welded are covered by scales from their manufacture or by other thin coverings. They are also melted always locally by the heater body when it performs the welding.

If the oxides or other compounds forming superficial layers of the bodies to be welded cannot be melted away economically, or if they can be melted but do not evaporate after melting, it is preferable to reduce them by suitable substances carried in a solid or fluid state by the heater body. Experience shows, that for this purpose the heater body should contain materials, as metals, metalloids, compounds and alloys, which, at least at the welding temperature, develop on oxidation more heat than is required for the reduction of the oxide layer on the surface of the bodies to be welded.

Again the heater body has to be moved along the seam with a speed suitable for forming the melt and for permitting the desired reduction of oxides contained therein from previous superficial layers of the bodies undergoing welding.

If other than oxide layers are to be removed, the additions to the heater body are to be chosen so as to react at welding temperature with the material of the layer and to form vapors or gases which escape.

Incidentally it may be mentioned that carbide and silicide determine by their nature and their amount the speed of the reduction, whereas the electrical resistance of the heater body is substantially determined by the content for instance of carbon or graphite in the heater body. The latter may consist for instance mainly of graphite or carbon and carbide or silicide, or of tungsten or molybdenum in which such carbide or silicide and graphite are incorporated in the desired amounts. Any desired electric resistance of the heater body can be adjusted by properly proportioning its constituents in order to develop a desired amount of heat at desired temperature during operation.

In welding thin bodies of alloys containing chromium, heater bodies may advantageously be used which consist substantially of graphite and an addition of 5% to 30% titanium carbide.

In welding thin bodies of metals or alloys liable to quick oxidation in air and particularly at high temperatures, as produced at the welding place, heater bodies consisting substantially of graphite and a minor portion of carbides of manganese, or molybdenum, or tungsten have proven successful.

Carbides or silicides are not necessarily to be added in their form of chemical compounds, but may be formed within the heater body during operation. Thus graphite incorporated into the heater body may combine with a metal added thereto, forming the desired carbide, and silicon may thus be added to the heater body and permitted to form silicides, while the heater body is heated to its operation temperature which generally lies within a range of 2000° to 2500° C.

Besides aluminum containing bodies to be welded liable to form oxides at least in superficial layers there may also be treated for instance bodies consisting of or containing manganese capable of easily forming manganese oxides, and chromium capable of forming chromium oxides. Besides such bodies, those of other compositions can also be welded advantageously according to my invention.

It is self-understood to anybody skilled in the art that the temperature of the heater body and the speed with which it is to be moved along the seam to be welded must be ascertained in each case by one or two short experiments, and that they depend upon the thickness and composition of the bodies to be welded, on the composition of the heater body and on the substances, if any, intended to be incorporated in or to react with the bodies undergoing welding. It may be mentioned by way of example only that in applying temperatures of between 2000° to 2500° C. on the surface of the heater body, a speed of about 1" to 2" per second is to be used in welding an overlapping or crimped seam of aluminum sheets of commercial purity having a thickness of about 1/25" to 1/50".

Another advantage of my invention is my ability to control to a great extent the crystal structure of the solidified melt forming the seam. As it is well known to the art, the growth of crystals in a melt during solidification depends substantially on the speed of its solidification. The quicker the solidification, the smaller the crystal growth. With my invention I can heat very rapidly small portions of metal or alloy close to the place contacted by the heater body. I can further move the latter quite fast along the seam. Therefore, behind the place just contacted by the heater body there remains a relatively small quantity of melted metal or alloy which quickly cools whereby undesired recrystallization, or growth of crystals is successfully prevented.

It is obvious that according to my invention, bodies cannot only be welded together along a desired seam, but bodies may also be welded upon each other along desired lines and surfaces, whereby seams between one body mounted upon the other are obtained. Thus, the invention may successfully be used for the purpose of applying to the surface of a metal a layer of harder material, consisting in melting and thereby welding, or fritting or sintering on to the surface of the metal the harder material which may be in a plastic or semi-plastic state and sometimes under pressure. To provide such pressure the heater body may be in the form of a roller. For example the heater body may contain the hard metal or other corrosion resisting matter to be welded upon the other body, and by moving the heater body along the supporting body, its surface is quickly heated by radiating high temperature heat evolving from the heater body to a temperature suitable for causing the hard metal or other matter to coalesce with the supporting body and thereby to cover the surface of the latter with the desired hard or otherwise corrosion resisting matter.

From the above description it appears that the bodies to be welded are affected locally at the places of welding not only for merely producing the desired weld but that additional effects are obtained. These effects may be physical and consist in overheating the place of welding whereby a drop of metal is obtained quasi running ahead of and in contact with the moved heater body, and in removing a covering layer of oxides. The effects may be chemical and consist in changing the constitution of the oxide cover of the weld.

As to be understood, my invention is not limited to any example given above but is to be derived in its broadest aspect from the appended claims.

What I claim is:

1. A method of electrically welding bodies of metal material melting considerably below 2000° C. and covered by an oxide layer, along a desired seam, comprising the steps of inserting the bodies to be welded and a heater body melting considerably above 2500° C., in a low voltage circuit so that the current can pass said bodies in parallel and in series therewith said heater body, closing said circuit by contacting said bodies with said heater body at a place to be welded, adjusting said circuit so as to heat said heater body to temperatures within and above the temperature range of about 2000° to 2500° C., thereby instantly melting and over-heating locally metal and oxide close to and in considerable amount ahead of said contacted place by the heat evolved by said heater body, and moving said heater body with an inclination considerably greater than 90° towards its direction of movement along the seam and in contact with the overheated melt thus formed, thereby causing successive portions of metal and oxide ahead and in contact with said heater body to be melted in contact with said overheated melt and by heat evolved by said heater body and protecting the portion of the seam welded just behind said heater body against access of air.

2. A method of electrically welding bodies of metal material melting considerably below 2000° C. selected from aluminum, manganese, chromium and alloys thereof, and covered by an oxide layer, along a desired seam, comprising the steps of inserting the bodies to be welded and a heater body melting considerably above 2500° C., in a low voltage circuit so that the current can pass said bodies in parallel and in series therewith said heater body, closing said circuit by contacting said bodies with said heater body at a place to be welded, adjusting said circuit so as to heat said heater body to temperatures within and above the temperature range of about 2000° to 2500° C., thereby instantly melting and overheating locally metal and oxide close to and in considerable amount ahead of said contacted place by the heat evolved by said heater body, and moving said heater body with an inclination considerably greater than 90° towards its direction of movement along the seam and in contact with the overheated melt thus formed, thereby causing successive portions of metal and oxide ahead and in contact with said heater body to be melted in contact with said overheated melt and by heat evolved by said heater body and protecting the portion of the seam welded just behind said heater body against access of air.

3. A method of electrically welding bodies of metal material melting considerably below 2000° C. and covered by an oxide layer, along a desired seam, comprising the steps of inserting the bodies to be welded and a heater body of material melting considerably above 2500° C. and also containing material capable of chemically reacting with the oxide of said layer, in a low voltage circuit so that the current can pass said bodies in parallel and in series therewith said heater body, closing said circuit by contacting said bodies with said heater body at a place to be welded, adjusting said circuit so as to heat said heater body to temperatures within and above the temperature range of about 2000° to 2500° C., thereby instantly melting and overheating locally metal and oxide close to and in considerable amount ahead of said contacted place by the heat evolved by said heater body and causing said material contained in said heater body to chemically react with said oxide, and moving said heater body with an inclination considerably greater than 90° towards its direction of movement along the seam and in contact with the overheated melt thus formed, thereby causing successive portions of metal and oxide ahead of and in contact with said heater body to be melted in contact with said overheated melt and by heat evolved by said heater body and protecting the portion of the seam welded just behind said heater body against access of air.

ALEXANDER RÁKOS.